US011529589B2

(12) United States Patent
Hansmann et al.

(10) Patent No.: US 11,529,589 B2
(45) Date of Patent: Dec. 20, 2022

(54) METHOD FOR PRODUCING A POROUS MONOLAYER POLYMER MEMBRANE, POROUS MONOLAYER POLYMER MEMBRANE, AND USE THEREOF FOR FILTRATION

(71) Applicant: Sartorius Stedim Biotech GmbH, Göttingen (DE)

(72) Inventors: Björn Hansmann, Göttingen (DE); Jörg Hosch, Boffzen (DE); Jan Schwellenbach, Göttingen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 203 days.

(21) Appl. No.: 16/756,815

(22) PCT Filed: Oct. 12, 2018

(86) PCT No.: PCT/EP2018/077836
§ 371 (c)(1),
(2) Date: Apr. 16, 2020

(87) PCT Pub. No.: WO2019/076740
PCT Pub. Date: Apr. 25, 2019

(65) Prior Publication Data
US 2020/0238221 A1  Jul. 30, 2020

(30) Foreign Application Priority Data
Oct. 19, 2017  (DE) .................... 10 2017 009 784.4

(51) Int. Cl.
*B01D 67/00* (2006.01)
*B01D 69/02* (2006.01)
*B01D 69/10* (2006.01)
*B01D 71/06* (2006.01)

(52) U.S. Cl.
CPC ......... *B01D 67/0013* (2013.01); *B01D 69/02* (2013.01); *B01D 69/105* (2013.01); *B01D 71/06* (2013.01); *B01D 2325/022* (2013.01)

(58) Field of Classification Search
CPC ............ B01D 67/0009; B01D 67/0011; B01D 67/0013; B01D 71/16
See application file for complete search history.

(56) References Cited

U.S. PATENT DOCUMENTS

| 4,976,859 A | 12/1990 | Wechs |
| 6,255,359 B1 | 7/2001 | Agrawal et al. |
| 2008/0241503 A1 | 10/2008 | Romdhane et al. |
| 2010/0166961 A1 | 7/2010 | Beard |
| 2013/0146539 A1* | 6/2013 | Larue ..................... B01D 71/68 210/500.21 |
| 2015/0258499 A1 | 9/2015 | Tkacik et al. |
| 2016/0166993 A1* | 6/2016 | Lee ......................... B01D 69/12 210/500.28 |
| 2018/0280890 A1* | 10/2018 | Nishiyama ......... B01D 67/0088 |

FOREIGN PATENT DOCUMENTS

| DE | 10326741 A1 | 12/2004 |
| EP | 0247596 A2 | 12/1987 |
| EP | 0689863 B1 | 8/1998 |
| EP | 1307280 B1 | 11/2005 |
| EP | 1509314 B1 | 7/2009 |
| EP | 2604329 A1 | 6/2013 |
| EP | 2134455 B1 | 7/2016 |
| EP | 3159057 | 4/2017 |
| JP | 2011101837 A | 5/2011 |
| WO | WO00/13768 A1 | 3/2000 |

OTHER PUBLICATIONS

Li et al., "A sacrificial-layer approach to prepare microfiltration membranes" Journal of Membrane Science, 320, 2008, p. 1-7 (Year: 2008).*
International Search Report and Written Opinion for PCT/EP2018/077836, dated Jan. 18, 2019.
Ji, Yu et al., "Morphological control and cross-flow filtration of microfiltration membranes prepared via a sacrificial-layer approach," *Journal of Membrane Science*, 353:159-168 (Feb. 2010).
Office Action for European Application No. 18785954.1 (dated Oct. 8, 2021) (w/ machine translation).
Xu, Hui et al., "From Particle-Assisted Wetting to Thin Free-Standing Porous Membranes," *Angew Chem Int Ed Engl*, 42(38):4694-4696 (Oct. 2003).

* cited by examiner

*Primary Examiner* — Ryan B Huang
(74) *Attorney, Agent, or Firm* — Klarquist Sparkman, LLP

(57) ABSTRACT

The present invention relates to a method for producing a porous monolayer polymer membrane, to a porous monolayer polymer membrane, and to the use of the polymer membrane for filtration.

7 Claims, 12 Drawing Sheets

METHOD FOR PRODUCING A POROUS MONOLAYER POLYMER MEMBRANE, POROUS MONOLAYER POLYMER MEMBRANE, AND USE THEREOF FOR FILTRATION

CROSS REFERENCE TO RELATED APPLICATIONS

This is the U.S. National Stage of International Application No. PCT/EP2018/077836, filed Oct. 12, 2018, which in turn claims the benefit of German Application No. 10 2017 009 784.4, filed Oct. 19, 2017, which application is incorporated herein in its entirety.

The present invention relates to a method for producing a porous monolayer polymer membrane, to a porous monolayer polymer membrane, and to the use of the polymer membrane for filtration.

A typical first step in the production of filtration membranes in phase separation processes is to cast casting solutions (homogeneous mixtures of various substances) into layers or into the form of shaped elements such as hollow fibers. Then the composition or the thermodynamic condition of the casting solution is altered until the demixing/phase separation is achieved. The phase separation gives rise to an integral phase with a coherent solid component. This component is obtained as a porous membrane or shaped element from the production method. Methods of this kind are carried out in one or more different method steps. Here, essentially four different mechanisms for the initiation of phase separation are distinguished:

(1) nonsolvent-induced phase separation (NIPS),
(2) vapor-induced phase separation (VIPS),
(3) evaporation-induced phase separation (EIPS), and
(4) thermally induced phase separation (TIPS),
along with combinations of these.

Additionally known is the production of porous membranes from a plurality of layers of casting solutions which differ in their respective composition. This method is often referred to as co-casting or multiple coating. Unlike methods which use only a single casting solution, the co-casting method produces multilayer (polylayer) membranes. This is because in co-casting a plurality of casting solution layers are applied simultaneously to a moving support so as to form a plurality of membrane-forming polymer layers.

According to IUPAC recommendation, filtration membranes are classified on the basis of their retentive properties and pore sizes. Hence, on the basis of the pore size, a general distinction is made between microfiltration membranes (mean pore size: 0.1 to 10 µm), ultrafiltration membranes (mean pore size: 0.01 to less than 0.1 µm), nanofiltration membranes (mean pore size: 0.001 to less than 0.01 µm), and reverse osmosis membranes (mean pore size: 0.0001 to less than 0.001 µm) (see Shang-Tian Yang, Bioprocessing for Value-Added Products from Renewable Resources, 2007).

In terms of the retentive properties of the membranes, a similar definition can be made on the basis of the molecular weight cut-off (MWCO). The MWCO relates to the solute having the lowest molecular weight in daltons, for which a fraction of 90% of the solute is retained by the membrane, or, alternatively, to the molecular weight of a molecule in daltons for which a fraction of 90% of the molecules having this molecular weight is retained by the membrane. Filtration membranes having an MWCO for test molecules or particles having a hydrodynamic radius of 0.1 to 10 µm are referred to as microfiltration membranes. Corresponding assignments of MWCO ranges are as follows: ultrafiltration membranes: 0.01 µm to less than 0.1 µm; nanofiltration membranes: 0.001 µm to less than 0.01 µm; and reverse osmosis membranes: 0.0001 µm to less than 0.001 µm.

Methods for Determining Mean Pore Size

Different methods are employed depending on the pore size under determination. In the region of microfiltration, it is principally capillary flow porometry that is used. Capillary flow porometry is a gas/liquid porosimetry wherein the differential gas pressures and flow rates through a membrane sample are measured first in the wet and then in the dry condition.

Prior to the measurement, the membrane sample is contacted with wetting liquid such that all of the available pores are filled with this liquid. After the filling of the pores and the introduction of the sample, the measuring cell is closed and the measurement commenced. On commencement of the measurement, the gas pressure is increased automatically and in steps, and the pore diameters corresponding to the prevailing pressure are emptied by the gas pressure. This continues until the relevant pore range has been covered, in other words until even the smallest pores within the measurement range have been freed of liquid. Thereafter the pressure is lowered again and the measurement is repeated automatically on the now dry sample. The pore size distribution is calculated from the difference in the two pressure/flow rate curves via the Young-Laplace equation. (See Shrestha, Aabhash, "Characterization of porous membranes via porometry" (2012), Mechanical Engineering Graduate Theses & Dissertations, Paper 38.)

In the case of ultrafiltration and nanofiltration membranes it is not possible to characterize the pore size distribution by a gas/liquid porosimetry, because the pores in these membranes possess a much smaller diameter. According to the Laplace equation, the pressure needed to displace the wetting liquid, for a given surface tension, rises to orders of magnitude of up to 50 to 70 bar. Such pressures not only complicate working and are in some cases limited by the available apparatus; what is more, the pressures exerted on the membrane, and hence forces resulting on the membrane, increase the likelihood of a change in the structure and, at the extreme, of a loss of structural integrity. The physical pore size distribution properties obtained here would not correspond to those of an intact membrane. In order to be able to carry out a characterization nevertheless, the aim is to lower the surface tension or interfacial tension of the wetting and displacing media. For this reason, a liquid-liquid displacement of two immiscible liquids is used. The interfacial tension between these two media is much lower than the surface tension between a gas and a liquid. The displacement of one liquid by another is subject (in analogy to the gas/liquid porosimetry) to the Laplace relation, and a similar measurement method can be used, with the difference that the rates recorded are not gas flow rates but rather flow rates of the displacing liquid as a function of the differential pressure increase. (See R. Dávila, Characterization of Ultra and Nanofiltration commercial Filters by Liquid-Liquid Displacement Porosimetry, 2013.)

Methods for Determining MWCO

The MWCO of different membranes is ascertained via the plotting of grading curves. In this case, samples of a polymer (dextran, polystyrene, pullulan, etc.) with a broad size distribution are filtered through the respective membrane. Subsequently both the feed solution and the filtrate are characterized by size exclusion chromatography. Via the depletion of certain polymer sizes in the filtrate it is possible to infer the retentive properties of the membrane and to compute a grading curve. The polymer weight at which a 90% retention is achieved is termed the MWCO. (See C. Loh, Effects of Additives and Coagulant Temperature on Fabrication of High Performance PVDF/Pluronic F127 Blend Hollow Fiber Membranes via Nonsolvent Induced Phase Separation, Chinese Journal of Chemical Engineering, 20 (1) 71-79 (2012).)

In accordance with the invention, the mean pore size and the MWCO can be determined as described above under "Methods for determining mean pore size" and "Methods for determining MWCO".

In addition to using the above parameters, the pore size distribution of the filtration membranes can also be classified via the membrane cross section. In that case filtration membranes having a (largely) uniform pore size along the membrane cross section are referred to as symmetric, whereas membranes having a pronounced pore size gradient along the membrane cross section are referred to as asymmetric.

In the wake of this description it is possible to define an asymmetry factor. This factor describes the ratio of largest and smallest pore size within the membrane cross section. For a factor of 1.5 or more, the membrane may be said to be asymmetric. If the asymmetry factor is less than 1.5, the membrane present is symmetric.

Different production methods are employed according to the desired membrane quality. Symmetric microfiltration membranes (composed, for example, of cellulose acetate (CA), cellulose nitrate (CN) or polyvinylidene fluoride (PVDF)) are produced primarily via EIPS methods. These single-stage methods allow only limited control over the mass transport processes and the associated membrane formation processes. It is not possible in this way to generate pore size gradients within the membrane, so denying access to asymmetric microfiltration and ultrafiltration membranes.

Asymmetric and symmetric nanofiltration membranes (composed of CA or polyethersulfone (PESU), for example), on the other hand, can be produced via NIPS methods. These single-stage methods, however, are not capable of producing asymmetric microfiltration and ultrafiltration membranes.

Asymmetric microfiltration membranes composed of polysulfone (PSU) or polyethersulfone (PES) can be produced via VIPS methods. Access to asymmetric ultrafiltration membranes is realized in accordance with the prior art only through a combination of VIPS and NIPS methods in two-stage methods. Since these two-stage methods entail numerous parameters which have to be controlled, there is demand for a simplified method for producing asymmetric ultrafiltration membranes.

The above methods for producing asymmetric membranes include a NIPS method stage (nonsolvent-induced phase separation). With phase inversion processes which are induced by nonsolvents, the surfaces of the top and bottom sides of the forming membrane have a substantially lower porosity at the phase boundaries between casting solution/precipitant (air side) and casting solution/substrate (belt or support side) than in the membrane interior. This circumstance is attributable essentially to two mechanisms:

The introduction of nonsolvent and the withdrawal of solvent from the casting solution film in a NIPS method at the casting solution/precipitant phase interface brings about gelling in the membrane-forming polymer used, so leading to the development of a dense polymer layer of low porosity (see F. Altena, Phase separation phenomena in cellulose acetate solutions in relation to asymmetric membrane formation, dissertation, 1982).

The gel layer which develops acts as a diffusive barrier to the further penetration of precipitant. As a consequence, the mass transfer of precipitant and solvent and therefore the rate of membrane formation decreases directly under the casting solution/precipitant phase boundary. In this way, gelling in the interior of the membrane is prevented, and the principal result is phase separation and hence the development of cellular, spongelike or fingerlike substructures with a higher porosity than in the gel layer.

This mechanism may be advantageous to the production of highly asymmetric nanofiltration membranes, but it prevents the production of open-pore symmetric and asymmetric microfiltration or ultrafiltration membranes (i.e., of microfiltration or ultrafiltration membranes having high surface porosity) in a one-step NIPS method.

Additionally, the nascent membrane structures which form during phase separation at interfaces (casting solution/precipitant and casting solution/support), under the condition that no gelling occurs, exhibit a tendency toward coalescence in the further formation process, so as to reduce the interfacial tension between polymer-rich phase, low-polymer phase, and the bordering phase (atmosphere or substrate (support)). This leads to a significant reduction in the surface porosity at support side and air side. The surface porosity of the resulting membranes is much lower than the total porosity of the membrane (see A. Deratani et al., Retainment of pore connectivity in membranes prepared with vapor-induced phase separation, Journal of Membrane Science 362 (2010), pages 360-373).

For commercial microfiltration membranes, the porosities at the air side and belt side of the membrane are typically 15-40%. The total porosity of such membranes is typically more than 70%. This porosity difference is especially a disadvantage because it leads to more rapid blocking of the flow-receiving membrane side and in a resultant reduction in permeability during a filtration step.

The total porosity here is understood as the mean porosity value over the total membrane cross section. It may easily be calculated from geometric and gravimetric data for a membrane sample:

$$\varepsilon_p = \frac{d_{Mem} \cdot A_{Mem}}{\frac{m_{Mem}}{\rho_{Poly}}}$$

Here, $d_{Mem}$ is the thickness of the membrane sample, $A_{Mem}$ is the membrane area, $m_{Mem}$ is the mass of the membrane sample, and $\rho_{Poly}$ is the density of the membrane-forming polymer.

One disadvantage of multilayer membranes obtained by co-casting is the usually abrupt change in pore sizes between the layers. In the case of the abrupt reduction in pore size on transition from one layer to another, performance losses occur: a broad range of particles sizes is retained at the interface of the layers generated by co-casting. This particle loading of the layer boundary leads to a loss of filter service life.

Co-casting is frequently used in order to achieve an increase in the size of the pores on the surface of the resultant membrane and to increase the flow performance relative to membranes having dense skin layers. However, the pore size increase when using the co-casting method is accompanied by a disadvantageous increase in the total thickness. Thick multi-ply layers of the kind obtained in the co-casting method can be less densely packed than monolayer membranes. In the case of the pleating of filter elements, for example, the total membrane thickness determines the maximum area which can be fitted into a given geometry of a filter element in the form of pleating. The thickness ought therefore to be minimized. In the case of co-cast membranes, moreover, there is a risk of delamination/layer separation during pleating, which is not the case with monolayer membranes.

It should be mentioned in this context that an increase in the pore size through co-casting is not accompanied by an increase in the surface porosity. Even if internal membrane surfaces with relatively large pores, enclosed by the bulk material of the membrane, are accessible through co-casting, it is not possible by this means to increase the surface porosity.

WO 00/13768 A1 discloses a method for producing a microporous glass membrane by applying a coating of a suspension containing glass particles to an inorganic, porous supporting element, and converting the suspension into a continuous glass phase by heating. The porous supporting element is removed again at least partially thereafter by treatment with acid. Porous polymer membranes and production methods therefor are not described.

JP 2011-101837 A, example 1, describes the production of a membrane for separating oil and water, wherein first a self-supporting sheet of polyethylene terephthalate (PET) is coated with a PVA solution, heated, and dried. The dried sheet is subsequently coated with a cellulose acetate casting solution, heated, and again dried. Thereafter the resulting PET-PVA-cellulose acetate composite structure is joined to a woven fabric support by heat exposure, and the surrogate layer of polyvinyl alcohol is removed by treatment with water.

DE 103 26 741 A1 discloses an asymmetric cellulose membrane having a porous upper layer, a porous lower layer, and between them a middle layer having two isotropic regions. The first isotropic region, which is adjacent to the upper layer, has smaller pores than the upper layer but larger pores than the second isotropic region, which is adjacent to the lower layer. The pores of the second isotropic region are smaller than the pores of the lower layer.

EP 2 134 455 B1 discloses a method for producing microporous asymmetric (cf. paragraph [0061]) polymer membranes by casting a casting solution comprising a membrane-forming polymer (e.g., cellulose acetate, cf. paragraph [0026]) simultaneously with a coagulant solution which comprises a nonsolvent for the membrane-forming polymer (e.g., water or acetone, cf. paragraph [0036]) and a coating assistant (e.g., polyethylene glycol or polyether), onto a moving support, wherein a part of the coagulant solution (cf. paragraphs [0032] to [0034] and [0038] and also claim 8) diffuses through the interface between the two layers into the casting solution and triggers a membrane-forming phase inversion (paragraph [0052] and FIG. 5). In the method there is no final treatment of the multilayer composite with a precipitation bath (cf. paragraphs [0009] and [0045]).

EP 1 509 314 B1 discloses a method for producing microporous asymmetric polymer membranes whose dense skin layer is made more open-pored by dissolution of the topmost polymer layer of the membrane (cf. paragraphs [0009], [0010], [0012], [0015], [0017], [0024] and [0025]), but includes no information as to how the specific exemplary embodiments were obtained.

US 2015/0258499 A1 discloses an asymmetric ultrafiltration membrane having a skin layer which is used for removing viruses from protein solutions. The membrane is a composite of a first microfilter or ultrafilter layer and of a second ultrafilter layer, the composite being produced by the essentially simultaneous casting (co-casting) of two or more polymer casting solutions onto a moving support. The two filter layers differ in their particle retention capacity.

EP 1 307 280 B1 discloses a co-casting production method for multilayer membranes, which are produced by application of a plurality of casting solution layers each with a membrane-forming polymer onto a moving support. After phase inversion, the resulting membrane has individual layers each having a different pore size, with a sharply defined change in the pore size at the interface between adjacent layers—characterized by a "demarcation line". Comparative examples disclosed include membranes produced only from a single layer of casting solution—the structure of these membranes is not characterized (cf. paragraphs [0072] and [0088] in conjunction with FIG. 9).

It is an object of the present invention, therefore, to provide a monolayer polymer membrane with high surface porosity and little difference between surface porosity and total porosity, and also a method for producing such a membrane.

This object is achieved by the embodiments characterized in the claims.

In a first aspect the present invention relates to a method for producing a porous monolayer polymer membrane, which comprises the following steps:

(A) providing a membrane-forming casting solution which comprises a membrane-forming polymer and a solvent therefor;
(B) providing a non-membrane-forming and nonprecipitating protective solution;
(C) providing a support;
(D) applying at least the casting solution and the protective solution to the support to form a film comprising a casting solution layer and a protective solution layer bordering thereon;
(E) contacting the film with a precipitant; and
(F) removing the protective solution layer.

A porous monolayer polymer membrane is available from the method of the invention. This membrane differs from polymer membranes from co-casting methods in that the porous polymer membrane of the invention has an integral polymer layer rather than a plurality of (e.g., two) layers delimited from one another. Furthermore, as a result of the method, it is possible to obtain a high surface porosity of 40% or more and also a total porosity which is 0.8 times to 1.4 times the surface porosity.

The surface porosity of a membrane surface is defined as the ratio of the area fraction of the pores within the total membrane area directly at the respective membrane surface. The surface porosity may be determined in accordance with the invention as described below.

The basis is an SEM micrograph of the respective surface. The image obtained is first binarized by means of computer-assisted analysis in order to differentiate between membrane elements (bulk material) and pores. This is preferably done using the method of Otsu (Nobuyuki Otsu (1979). "A threshold selection method from gray-level histograms". IEEE Trans. Sys., Man., Cyber. 9 (1): 62-66). The binarized image in the following step is evaluated in respect of the respective area fractions, to give a value for the surface porosity.

The particular structural features of the monolayer polymer membrane of the invention may be obtained as a result of the presence of the protective solution layer. The protective solution layer influences the mass transfer of the casting solution layer with the surroundings, and also the interfacial tension between the phases in contact, which has a critical influence on the precipitation of the membrane and/or the phase inversion/phase separation in step (E). In commonplace production methods, the phase separation is influenced solely by the ambient conditions (e.g., composition of the atmosphere or of the precipitation bath, pressure and temperature). The presence of the protective solution layer provides an additional facility for influencing the phase separation, so allowing the production of hitherto unobtainable polymer membranes.

There is no particular limitation on the membrane-forming casting solution. According to the present invention it is possible to use any solution of a polymer suitable for forming membranes. The casting solution is a homogeneous solution of the membrane-forming polymer, and additionally comprises a solvent for the polymer. According to the present invention, optionally, there may be one or more auxiliaries in the casting solution. Suitable auxiliaries in accordance with the invention are swelling agents, solubilizers, hydrophilizing agents, pore formers (porogens) and/or nonsolvents for the membrane-forming polymer. Such auxiliaries are known to the skilled person and are adapted to the membrane-forming polymer. The casting solution preferably consists of the membrane-forming polymer, the solvent, and also, optionally, one or more auxiliaries, preferably a nonsolvent.

If the casting solution includes a nonsolvent (or another precipitant) for the membrane-forming polymer, then the maximum concentration of the nonsolvent (or precipitant) is not enough to lead to precipitation of the membrane-forming polymer. The casting solution preferably consists of the solvent for the membrane-forming polymer, the membrane-forming polymer, and a nonsolvent (mixture). Examples of suitable nonsolvents are water, glycerol, isopropanol, ethanol, and mixtures of these.

The membrane-forming polymer is preferably selected from the group consisting of cellulose acetate, cellulose nitrate, polysulfone, polyvinylidene difluoride (PVDF), polyethersulfone, polyetheretherketone (PEEK), polyacrylonitrile, polymethyl methacrylate (PMMA), and mixtures thereof, preferably cellulose acetate. More preferably, the membrane-forming polymer is a mixture of cellulose diacetate and cellulose triacetate.

The solvent for the membrane-forming polymer is a liquid which is capable of dissolving the membrane-forming polymer. Its solubility for the membrane-forming polymer (or for each of the membrane-forming polymers) under standard conditions (25° C., 1013 hPa) is preferably (in each case) at least 2 wt %, more preferably at least 5 wt %. Suitable solvents are known to the skilled person. Examples of suitable solvent/polymer combinations are dichloromethane and cellulose acetate, 2-pyrrolidone and polyethersulfone, acetone and cellulose acetate, N-methylpyrrolidone and polyethersulfone, dioxane and cellulose acetate, γ-butyrolactone and polyethersulfone, and mixtures thereof. Preferred solvents for cellulose acetate are dioxane and acetone, more preferably a mixture of these. A suitable solvent for polyethersulfone is N-methylpyrrolidone.

On the basis of their knowledge in the art, the skilled person is capable of providing a casting solution from the membrane-forming polymer and the solvent.

Step (A) preferably comprises the steps of
(A1) initially introducing the solvent for the membrane-forming polymer;
(A2) adding the membrane-forming polymer to the solvent;
(A3) optionally adding the auxiliary or auxiliaries, preferably a nonsolvent for the membrane-forming polymer; and
(A4) stirring the mixture of the solvent, the polymer, and optionally the auxiliary or auxiliaries, to form the homogeneous casting solution.

There is no particular limitation on the protective solution provided in step (B). The protective solution is nonprecipitating. This means that its nature is such that on contact with the casting solution in step (D) it does not trigger precipitation (phase inversion or phase separation) of the casting solution layer. Furthermore, the protective solution is not membrane-forming. This means that its composition is such that it does not itself form the basis for a membrane or membrane layer.

In accordance with the invention it is possible to use a solution of a polymer not capable of forming a membrane (surrogate polymer) and a solvent therefor. It is, however, also possible for the protective solution to contain no surrogate polymer and/or relatively small molecules for modifying the viscosity or solution properties. A protective solution containing no surrogate polymer may comprise or consist of 2-pyrrolidone, for example.

Under standard conditions (25° C., 1013 hPa) the protective solution preferably has a viscosity of at least 0.8 cP. It is preferred, moreover, for the viscosity of the protective solution under standard conditions to be not more than 100 000 cP.

In accordance with the invention, the protective solution may include a membrane-forming polymer, but at most in a concentration not sufficient to give rise to a membrane (layer) from the protective solution. Any membrane-forming polymer is preferably present at most with a fraction of 5 wt %, preferably at most 1 wt %. It is preferred for the protective solution to contain no membrane-forming polymer (that is, no polymer capable of forming a membrane).

In step (B), preferably in a manner similar to step (A), a protective solution is provided, with the proviso that the protective solution comprises a polymer not capable of forming a membrane (surrogate polymer). This means that the protective solution can be produced, in accordance with the invention, like a customary casting solution for membrane formation, with the use, rather than of a membrane-forming polymer, of a surrogate polymer which is not capable of forming membranes.

There is no particular limitation on the surrogate polymer. Preferred polymers are those which differ in solubility from the membrane-forming polymer in the respect that they are soluble in at least one nonsolvent used for the membrane-forming polymer or can be removed by this nonsolvent. With particular preference a surrogate polymer is a polymer or comprises a plurality of polymers selected from the group consisting of polyvinylpyrrolidone, polyethylene glycol, polysaccharides and/or polyvinyl alcohol. The amount of the surrogate polymer in the protective solution is preferably at least 1 wt %, more preferably at least 5 wt % and especially preferably at least 20 wt %. It is preferable for the amount of the surrogate polymer to be not more than 80 wt %, more preferably not more than 70 wt %, especially preferably not more than 60 wt %.

Suitable solvents for producing the preferred protective solution comprising the surrogate polymer are, in accordance with the invention, all solvents which are capable of dissolving the surrogate polymer and which do not represent a precipitant for the membrane-forming polymer. Solvent mixtures as well can be used as solvents for the surrogate polymer. Surrogate polymer-solvent pairings suitable in accordance with the invention are for example polyethylene glycol (PEG) and N-methylpyrrolidone (NMP), polyvinylpyrrolidone (PVP) and dioxane, and PVP and acetone.

The protective solution may comprise the same auxiliaries as the casting solution, including a nonsolvent for the membrane-forming polymer, provided the concentration does not lead to precipitation at the interface between casting solution and protective solution.

In accordance with the invention the protective solution may include a precipitant (especially a nonsolvent) or a precipitant mixture for the membrane-forming polymer, but only at a concentration not sufficient to lead to precipitation of the membrane-forming polymer on contact of the protective solution with the casting solution. An example of a suitable nonsolvent for the protective solution is water, glycerol, isopropanol or ethanol.

According to one preferred embodiment of the present invention, the protective solution contains no precipitant for the membrane-forming polymer.

A solvent or solvent mixture used may be different from the solvent of the casting solution. For the protective solution it is preferred to use the same solvent (mixture) as for the casting solution. Preferred solvents for the protective layer are dioxane and acetone; a mixture of these is particularly preferred.

With particular preference the protective solution and the protective solution layer formed from it consist of the surrogate polymer, the solvent therefor, and a nonsolvent.

Step (B) preferably comprises the steps of
(B1) initially introducing the solvent for the surrogate polymer;
(B2) adding the surrogate polymer to the solvent for the surrogate polymer;
(B3) optionally adding the auxiliary or auxiliaries; and
(B4) stirring the mixture of the solvent for the surrogate polymer and the surrogate polymer to form the protective solution.

The auxiliary used optionally in step (B3) may be, for example, a nonsolvent for the membrane-forming polymer.

The support provided in step (C) is not subject to any particular limitation. In accordance with the invention it is possible to use any support suitable for membrane production methods from the prior art. The support has preferably a planar surface and is inert toward the substances used (casting solution, protective solution, their constituents, etc.). Serving preferably as support is a moving belt (conveyor belt) or a drum, enabling a continuous regime of the method.

In step (D) at least the casting solution and the protective solution are applied to the support. As a result, a film is formed which comprises a casting solution layer and a protective solution layer, with the casting solution layer bordering the protective solution layer. In accordance with the invention, the casting solution layer borders the protective solution layer directly, meaning that there are no other layers in between. The casting solution layer and protective solution layer have a common interface.

The timespan between the application of the casting solution layer and the application of the protective solution layer is not limited in accordance with the invention. To prevent unwanted premature precipitation/phase inversion, however, it is an advantage to keep the above timespan as short as possible. This timespan is preferably not more than 5 minutes, more preferably not more than 1 minute, especially preferably not more than 30 seconds.

It is an advantage, moreover, if step (E) follows on directly from step (D), meaning that no other step is carried out between steps (E) and (D). In particular it is advantageous not to carry out any drying step between steps (E) and (D).

Other than the casting solution provided in step (A), the method of the invention does not use any further casting solution suitable for formation of a polymer membrane. This means that the casting solution provided in step (A) is the only casting solution for membrane formation. The membrane comes about solely from this single casting solution. The film formed in step (D) therefore includes only one casting solution.

It is possible, however, in addition to the casting solution and the protective solution, to apply one or more further protective solutions, so producing a film comprising casting solution layer, protective solution layer, and further protective solution layer(s). The film preferably consists of the casting solution layer and the protective solution layer, and so there are no further layers or films present on the support. This means that the support is preferably coated only with the film comprising the casting solution layer and the protective solution layer.

According to one preferred embodiment, the film in step (D) is formed by applying the casting solution to the support to form the casting solution layer, and applying the protective solution layer to the casting solution layer to form the protective solution layer. According to an alternative embodiment, in step (D) the protective solution layer is applied to the support to form the protective solution layer, and the casting solution is applied to the protective solution layer to form the casting solution layer. This means that it is possible for the casting solution layer to be located between the protective solution layer and the support. In that case the protective solution layer represents an upper coating. It is also possible, alternatively, for the protective solution layer to be located between the casting solution layer and the support. In that case the protective solution layer represents a lower coating.

In accordance with the invention there may be one protective solution layer as an upper coating and a further protective solution layer as a lower coating. The film formed in step (D) preferably consists of the casting solution layer and the protective solution layer, with the casting solution layer located between the support and the protective solution layer (protective solution takes the form of an upper coating).

The application of the casting and protective solution(s) in step (D) is not subject to any particular limitation and may be accomplished, for example, by knife coating or by means of a nozzle.

The application of the casting and protective solution(s) in step (D) may be carried out successively (sequentially, as described in EP 0 689 863 B1, for example) or substantially simultaneously as described in US 2015/0258499 A1, for example.

As already mentioned above, the protective solution layer has an influence on phase separation. In particular, and, surprisingly, irrespective of whether the protective solution layer is a lower coating and/or an upper coating, the surface porosity of the major surface of the membrane that possesses a common interface with a protective solution layer is significantly increased in comparison to conventional methods. Furthermore, the total porosity of the membranes of the invention or membranes obtained from the method of the invention corresponds approximately to the surface porosity of the major surface(s) of the membrane which during the method form(s) a common interface with the protective solution layer(s).

It is presumed that the surprising effects of the protective solution layer, above, can be explained by two mechanisms.

First, in the presence of the protective solution layer as an upper coating, there is initially no phase separation in the casting solution layer. In contrast to conventional methods, there is no direct contact with a layer which comprises a precipitant in a concentration such as to initiate phase separation. In the upper coating case of the invention, the phase separation of the casting solution layer is diffusion-limited: the precipitant must first diffuse through the protective layer and accumulate in the casting solution layer before precipitation is initiated. Hence the surprising observation that the precipitant-side gelling observed above for conventional methods does not occur. Consequently, the production method of the invention does not result in the formation of a skin layer with small pores and low surface porosity; instead, an open-pore structure with high surface porosity is developed.

The second mechanism explains in particular the remarkable circumstance that higher support-side surface porosity is observed, even in comparison to a membrane produced with direct contact with the support, when the protective coating solution is the lower coating and in step (E) the casting solution layer comes into direct contact with the precipitant. (Although this effect also comes to bear at least partly when the protective solution layer is an upper coating.). If the casting solution is applied directly to the support, a precisely defined phase boundary is developed between the solid support and the casting solution layer. In contrast to this, the various components of the protective solution layer as a lower coating, on the one hand, and the casting solution layer, on the other hand, are able to diffuse partially into the other layer in each case. According to this explanation model, diffusive mass transfer causes the casting solution layer to be seeded or impregnated at least partially with constituents of the protective solution layer, and the temporary impregnation for the duration of membrane production influences phase inversion in such a way that in the case of the lower coating, comparable effects as in the case of the upper coating are observed. As a result of the lower coating, moreover, the interfacial tension of the membrane is influenced on the support side, causing a reduction in coalescence during membrane formation. In this way, structures formed nascently are conserved to a greater extent, leading likewise to a higher surface porosity. The structure of the membrane is not disrupted or altered by this, since the protective solution layer is removed completely in step (F). However, an upper coating of the casting solution with the protective layer is preferred over a lower coating, since in the case of the upper coating the above effects (especially a high surface porosity and suppression of the formation of a skin layer) are more strongly pronounced.

The precipitant used in step (E) is not subject to any particular limitation. In accordance with the invention it is possible to use the same precipitants as in conventional production methods for polymer membranes. The precipitant leads to precipitation (phase inversion) of the membrane-forming polymer in the casting solution layer. The precipitant may be gaseous or liquid, or may be present in the form of a dissolved solid. The precipitant may be a single compound or a mixture of two or more compounds. With preference the precipitant is present in a liquid, and with particular preference the precipitant is itself a liquid. Step (E) takes place preferably by immersion of the film into a liquid which comprises or consists of the precipitant.

The precipitant is preferably a nonsolvent for the membrane-forming polymer or for each of the membrane-forming polymers. The nonsolvent is a liquid which is not capable of dissolving the membrane-forming polymer. The nonsolvent for the membrane-forming polymer (or for each of the membrane-forming polymers) preferably has a solubility under standard conditions of (in each case) at most 1 wt %, more preferably at most 0.1 wt %. A preferred precipitant is also a solvent for the surrogate polymer, with water being particularly preferred. If the precipitant is also a solvent for the surrogate polymer, the protective solution layer can be removed in a one-step process.

The removal of the protective solution layer(s) in step (F) is not subject to any particular limitation. In accordance with the invention, it is possible for the protective solution layer(s) to be removed mechanically. With preference the protective layer is removed using a solvent for the surrogate polymer, the solvent for the surrogate polymer being a nonsolvent for the membrane-forming polymer. Step (F) is accomplished preferably by immersion of the film into a liquid which comprises or consists of the solvent for the surrogate polymer. The solvent for the surrogate polymer that is used is preferably water.

As an alternative, the surrogate polymer may also be decomposed chemically by an agent or two or more agents. The agent or agents lead selectively to a degradation of the surrogate polymer into soluble constituents of low molecular mass, while the membrane-forming polymer is inert toward chemical degradation by the agent or agents.

In the further course, the monolayer membrane obtained from the casting solution layer may undergo one or more washing steps, and/or drying steps.

In a further aspect, the present invention relates to a porous monolayer polymer membrane without skin layer, wherein at least one of the major surfaces of the polymer membrane has a surface porosity of at least 40%, and the total porosity of the polymer membrane is 0.8 times to 1.4 times the at least 40% surface porosity. A membrane of this kind may be obtained by the production method of the invention.

"Major surfaces" are the two membrane surfaces having the greatest area.

As already mentioned above, the monolayer membrane of the invention differs from polymer membranes from co-casting methods in that the porous polymer membrane of the invention has an integral polymer layer rather than a plurality of (e.g., two) layers delimited from one another. According to the prior art, the individual layers are delimited from one another, in the interface between the individual layers, by an abrupt or discontinuous change in the pore size or in the other properties (density, porosity, membrane polymer), in the form, for example, of the demarcation line between adjacent polymer layers that is known from EP 1 307 280 B1.

At least one major surface of the membrane of the invention has a surface porosity of at least 40%, preferably at least 50%, more preferably at least 60%, especially preferably at least 70%, most preferably at least 80%. With preference both major surfaces independently of one another have the above surface porosities.

In accordance with the invention it is sufficient if one of the major surfaces of the membrane has a surface porosity of at least 40%. This means that one of the major surfaces of the membrane may have a surface porosity of less than 40%. It is preferred if at least the precipitant-side major surface has a surface porosity of at least 40%. With preference both major surfaces of the membrane of the invention have a surface porosity of at least 40%.

According to the present invention, the membrane has no skin layer, and this is associated with a high throughflow. The presence of a skin layer on a major surface can be ruled out especially when the mean pore size thereof is at least 10 nm, preferably at least 15 nm. With such a mean pore size, porous structures are still evident in a scanning electron micrograph of the relevant major surface at 20 000 times magnification. The mean pore size of the major surface may be determined using the above-described method of liquid-liquid displacement porosimetry on the basis of two immiscible liquids.

The total porosity of the membrane of the invention lies in the region of the surface porosity of the major surface with higher surface porosity (more porous major surface) and is 0.8 times to 1.4 times the at least 40% surface porosity. Where both major surfaces of the membrane have a surface porosity of at least 40%, the total porosity is 0.8 times to 1.4 times the higher surface porosity. Preferably the total porosity is at least 0.9 times, preferably at least 0.95 times, more preferably at least 0.99 times the surface porosity of the more porous major surface. Preferably the total porosity is at most 1.3 times, preferably at most 1.2 times, more preferably at most 1.1 times the surface porosity of the more porous major surface. The membrane of the invention has a total porosity of at least 32%, preferably at least 40%, especially preferably at least 50%, more preferably at least 60%, more preferably still at least 70%, and most preferably at least 80%.

A high porosity means that a high fraction of the membrane volume is occupied by pores. For a given membrane volume and pore size, therefore, a higher porosity is associated with a higher efficiency (separation or filtration performance).

There is in principle no limitation on the thickness of the membrane of the invention. The thickness is preferably at most 400 µm, more preferably at most 300 µm, very preferably at most 250 µm.

The monolayer porous polymer membrane of the invention may be either symmetric or asymmetric. According to one preferred embodiment, the membrane of the invention is asymmetric, meaning that it has an asymmetry factor of at least 1.5. The asymmetry factor is preferably at least 2.5. The upper limit of the asymmetry factor of the membrane of the invention is not restricted and is preferably 10. This means that the polymer membrane of the invention preferably has an asymmetry factor of 1.5 to 10.

The asymmetry factor of an asymmetric membrane or membrane layer is the ratio of the maximum pore size to the minimum pore size of the membrane or membrane layer, with the maximum and minimum pore size being based, respectively, on one membrane (layer) of the overall element of the membrane (layer). The integral pore size distribution may be determined analogously to the surface porosity. Using SEM, a micrograph is taken of the membrane cross section (perpendicular to the membrane major surfaces) with sufficient resolution. The image obtained is first binarized by means of computer-assisted analysis, in order to differentiate between membrane elements and pores. This is preferably done using the aforementioned method according to Otsu (Nobuyuki Otsu (1979), "A threshold selection method from gray-level histograms", IEEE Trans. Sys., Man., Cyber. 9 (1), 62-66). In the following step, the binarized image is evaluated for the respective distances between membrane elements and pores over the entire membrane element, so as to obtain an integral pore size distribution. The asymmetry factor can be calculated from the respective minimum and maximum.

The mean pore size of the polymer membrane of the invention is not subject to any particular limitation. For example, the membrane may be a micro-, ultra-, nano- or reverse osmosis membrane. The membrane is preferably a microfiltration membrane or ultrafiltration membrane, more preferably an ultrafiltration membrane.

According to one preferred embodiment the membrane of the invention is made of a membrane-forming polymer selected from the group consisting of cellulose acetate, cellulose nitrate, polysulfone, polyvinylidene difluoride (PVDF), polyethersulfone, polyetheretherketone (PEEK), polyacrylonitrile, polymethyl methacrylate (PMMA), and mixtures thereof, preferably cellulose acetate. Particularly preferred is a mixture of cellulose diacetate and cellulose triacetate.

With regard to the possible use of the membrane of the invention, there is no particular limitation. It can be used for filtration, especially for the filtration of viruses, proteins or macromolecules.

Figure 7:
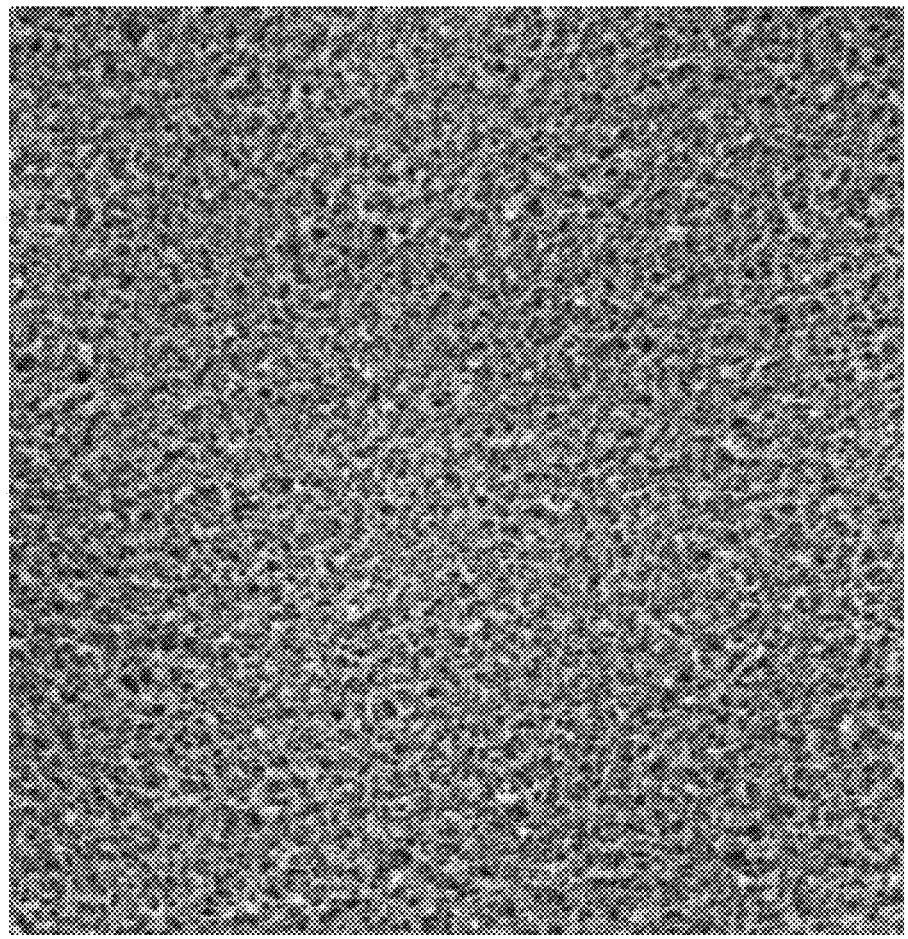

FIG. 7 shows an SEM micrograph of the membrane from Inventive Example 2. In evidence is the membrane side which was in contact with the protective solution (surrogate solution 1) (support side). It is clearly evident that the support-side major surface of the membrane has a high surface porosity.

Figure 8:
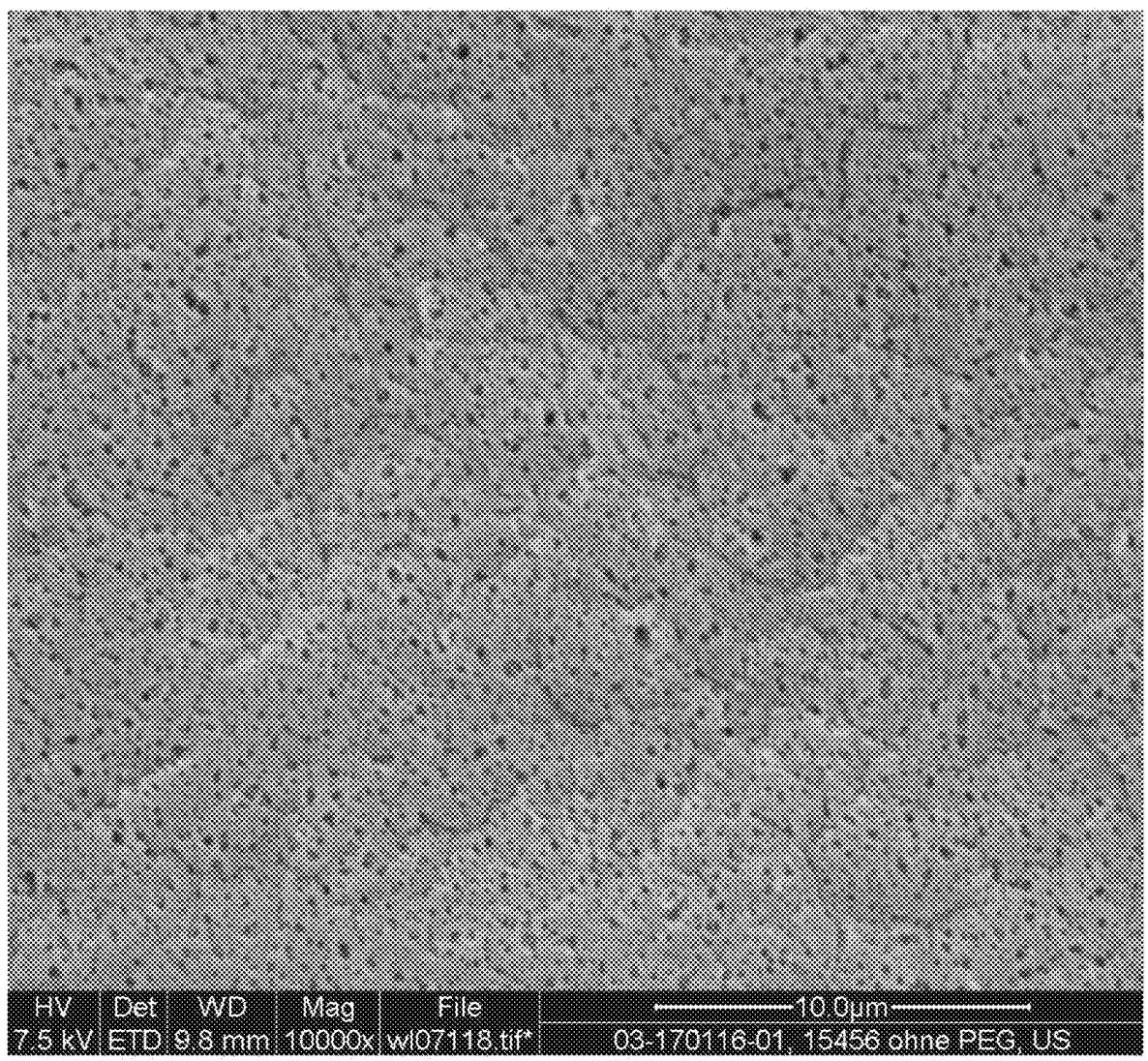

FIG. 8 shows an SEM micrograph of the membrane from Comparative Example 3. In evidence is the membrane side which was in contact with the glass surface (support side) and which has a low surface porosity in comparison to Inventive Example 2.

Figure 9:
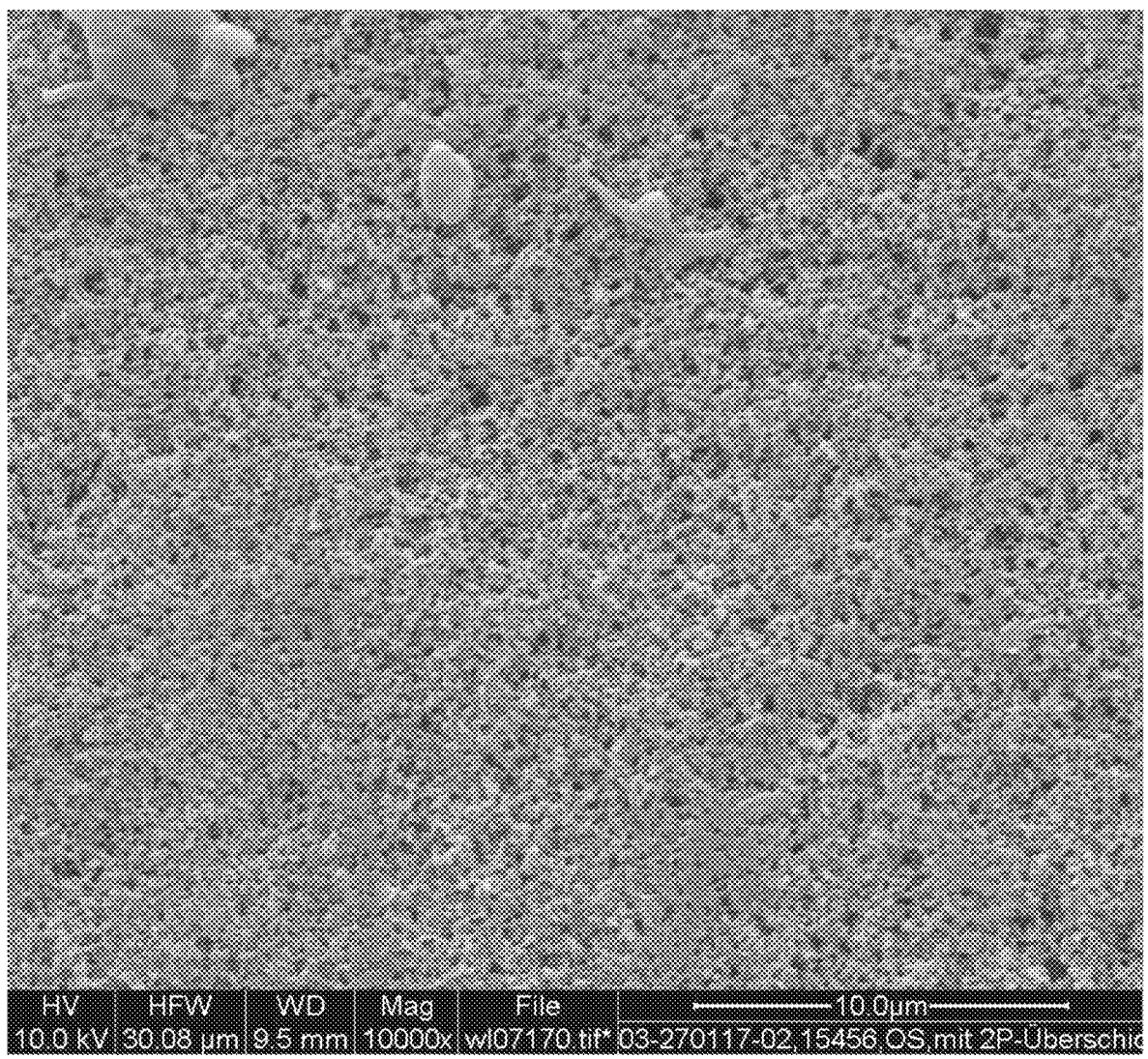

FIG. 9 shows an SEM micrograph of the air side of the membrane from Inventive Example 3. Clearly in evidence are the globular structure, a high surface porosity, and the absence of a skin layer.

Figure 10:
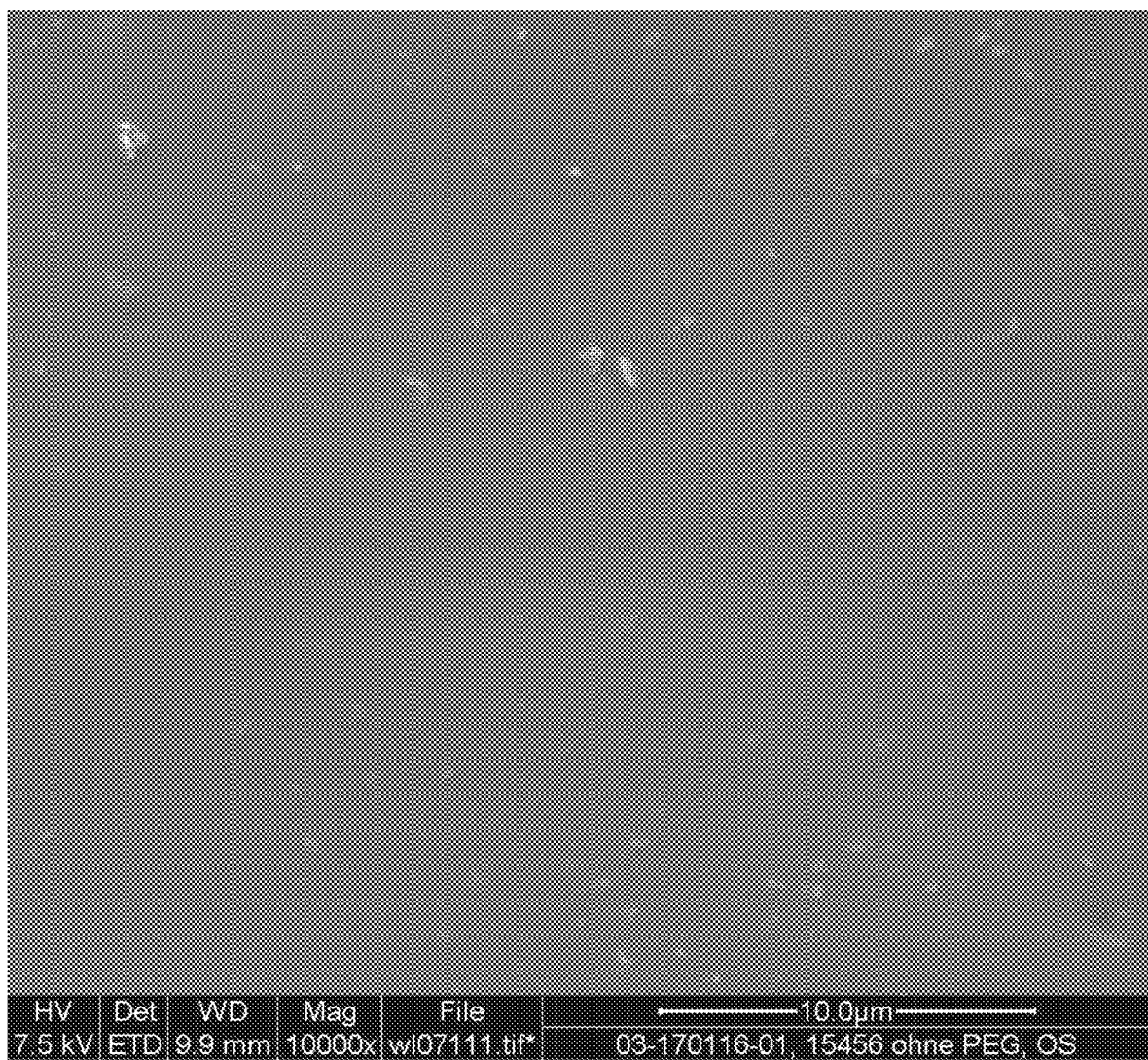

FIG. 10 shows an SEM micrograph of the air side of the membrane from Comparative Example 4. Clearly in evidence are the absence of porous structures and the presence of a skin layer.

Figure 11:
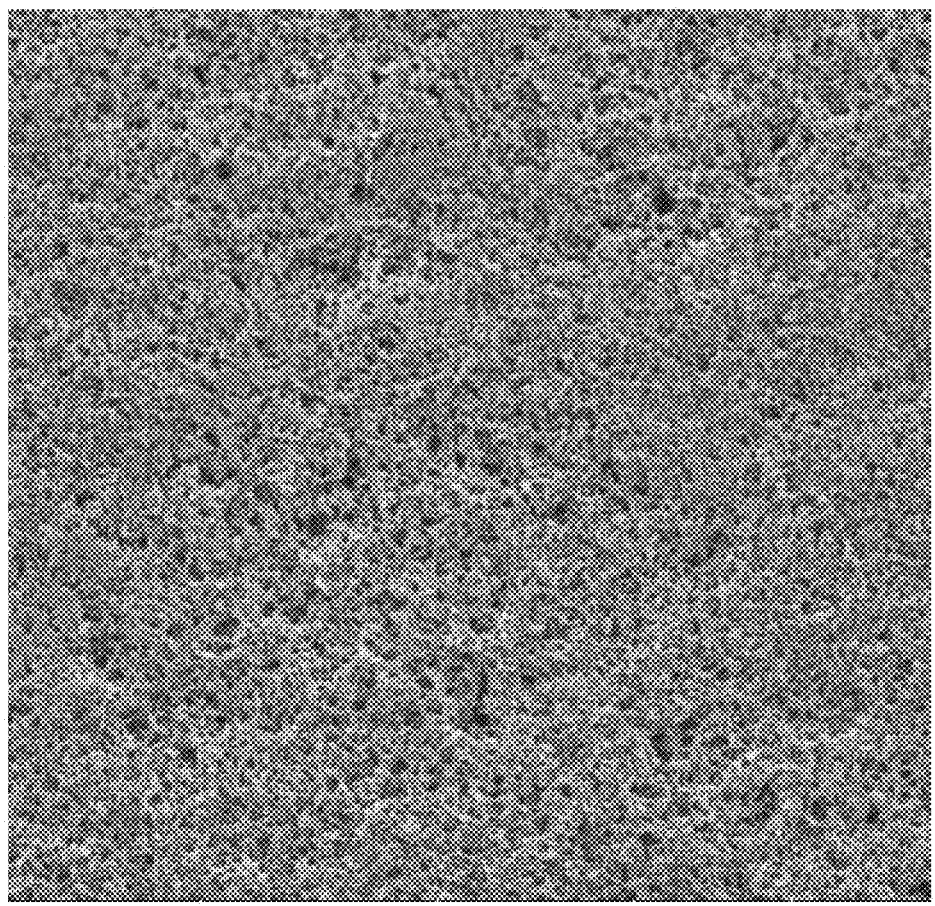

FIG. 11 shows an SEM micrograph of the membrane from Inventive Example 2. In evidence is the membrane side which was in contact with the protective solution 2 (surrogate solution 2) (air side). Clearly in evidence are the globular structure, a high surface porosity, and the absence of a skin layer.

Figure 12:
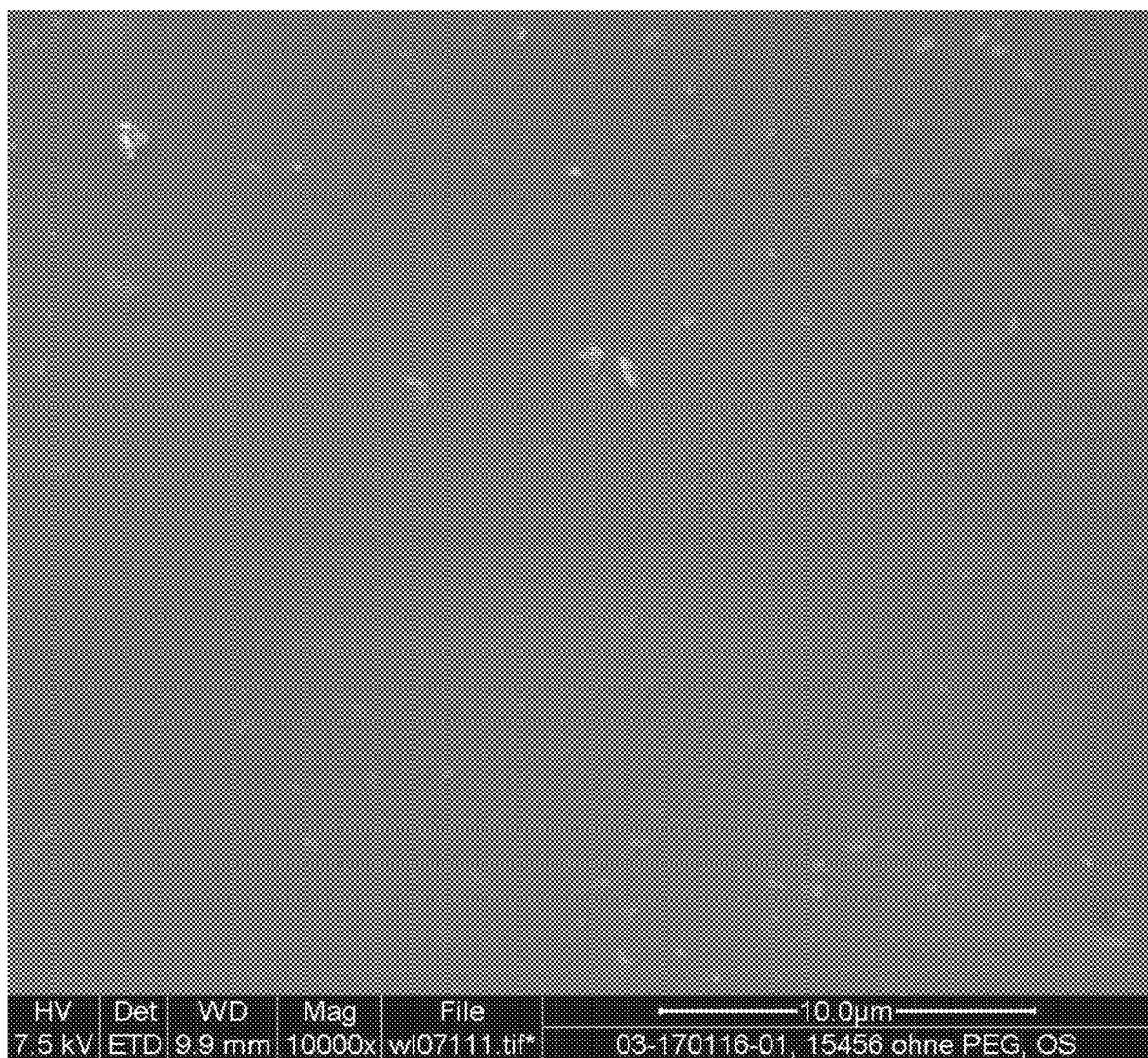

FIG. 12 shows an SEM micrograph of the membrane from Comparative Example 3. In evidence is the membrane side, which was not in contact with the glass surface (air side).

The present invention is elucidated in more detail by the following, nonlimiting examples.

EXAMPLES

Inventive Example 1: Production of an Asymmetric Microfiltration Membrane from Cellulose Acetate in a Precipitation Bath Process Casting Solution The casting solution was prepared from the constituents from Table 1 in a stirred reactor at 40° C. The acetone and dioxane components were introduced initially and the solids were added in powder form. As soon as the polymer solution was no longer turbid (after about 3 hours), formamide was added. In this composition the casting solution can be kept for about 48 hours at room temperature.

TABLE 1

| Composition of the casting solution | |
| --- | --- |
| Constituents | Mass fraction [%] |
| Cellulose triacetate (Eastman, CA 398) (12.8%) | 12.8 |
| Cellulose diacetate (Acetati, Aceplast PC/FG) (3.2%), | 3.2 |
| Acetone | 28 |
| Dioxane | 28 |
| Formamide | 28 |

Protective Solution

The protective solution (upper coating) was prepared as for the preparation of the casting solution. The composition of the protective solution is reported in Table 2.

TABLE 2

| Composition of the protective solution | |
| --- | --- |
| Constituents | Mass fraction [%] |
| Polyvinylpyrrolidone (PVP, $M_w$ = 360 000 g/mol) of "K90" type from BASF | 10 |
| Acetone | 30 |
| Dioxane | 30 |
| Formamide | 30 |

Unless otherwise indicated, the protective and casting solutions in the following examples were prepared as described in Inventive Example 1.

Membrane Production

The casting solution with the composition from Table 1 was coated out evenly to a thickness of 300 μm, using a knife coater, onto a glass plate used as support, in a dry (anhydrous) nitrogen atmosphere at a glass plate and atmosphere temperature of 22° C. Thereafter the upper coating was knife-coated over the casting solution film in a thickness of 200 μm. The application process was over after less than 30 seconds.

Set up in an air atmosphere with 22° C. and <40% relative humidity was a water bath at 22° C. which was able to fully cover the glass plate. The coated layers on the glass plate were immersed fully into the water bath in less than 20 seconds, starting from one side of the glass plate, and shaken for 30 minutes. After these 30 minutes, the water was replaced and the glass plate, with the now precipitated membrane, was shaken again for 30 minutes. After complete removal of the upper coating, the membrane was lifted from the glass plate and dried on a fleece underlay at 22° C. The dry membrane was subjected to the following characterizations: scanning electron microscopy (SEM) and throughflow.

Figure 1:
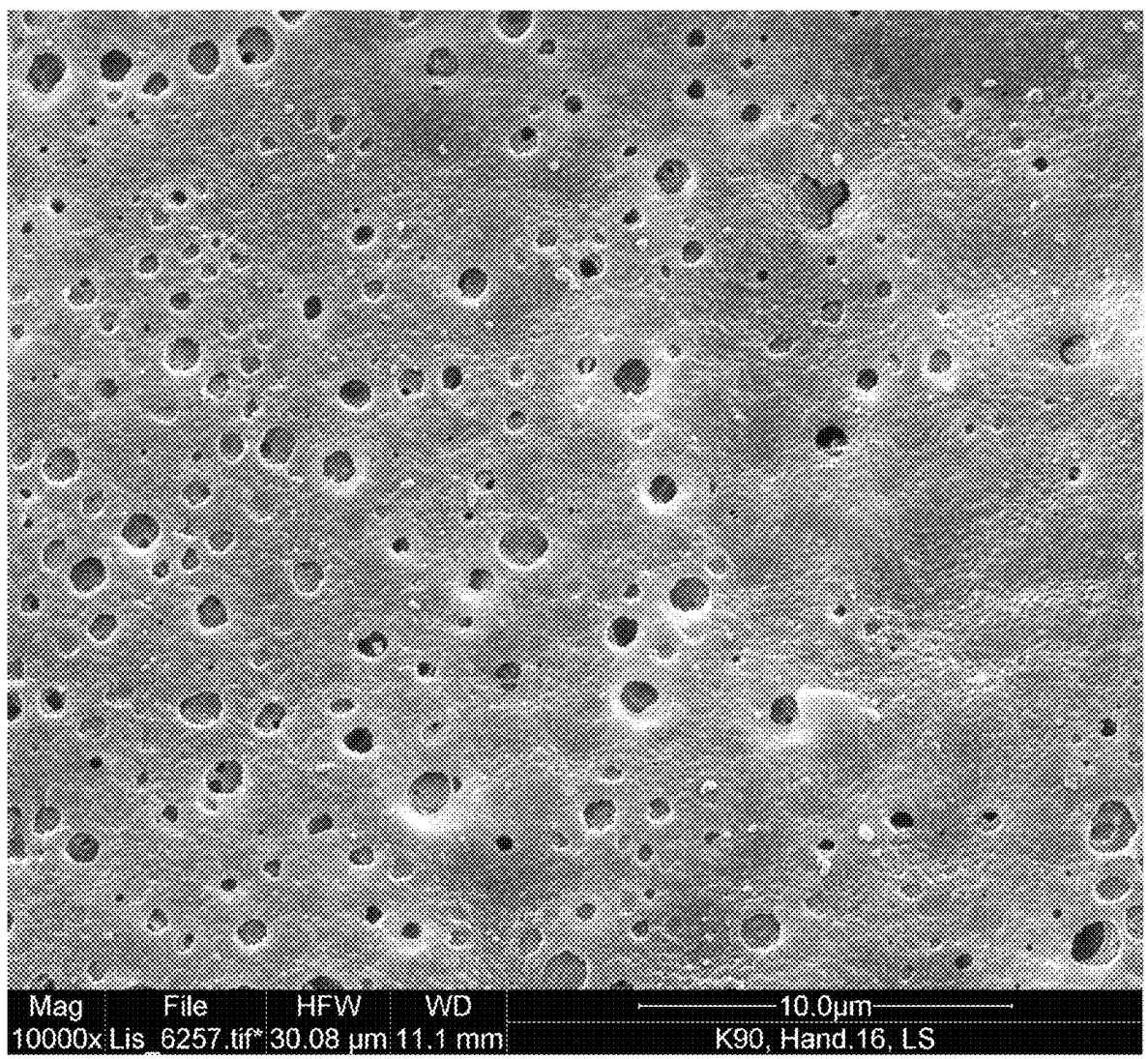
FIG. 1 shows an SEM micrograph of the side (major surface) of the membrane from Inventive Example 1 that is formed from a casting solution layer which during production bordered an upper coating solution (air side). Clearly in evidence is a porous structure which extends into the depth of the membrane.
Figure 2:
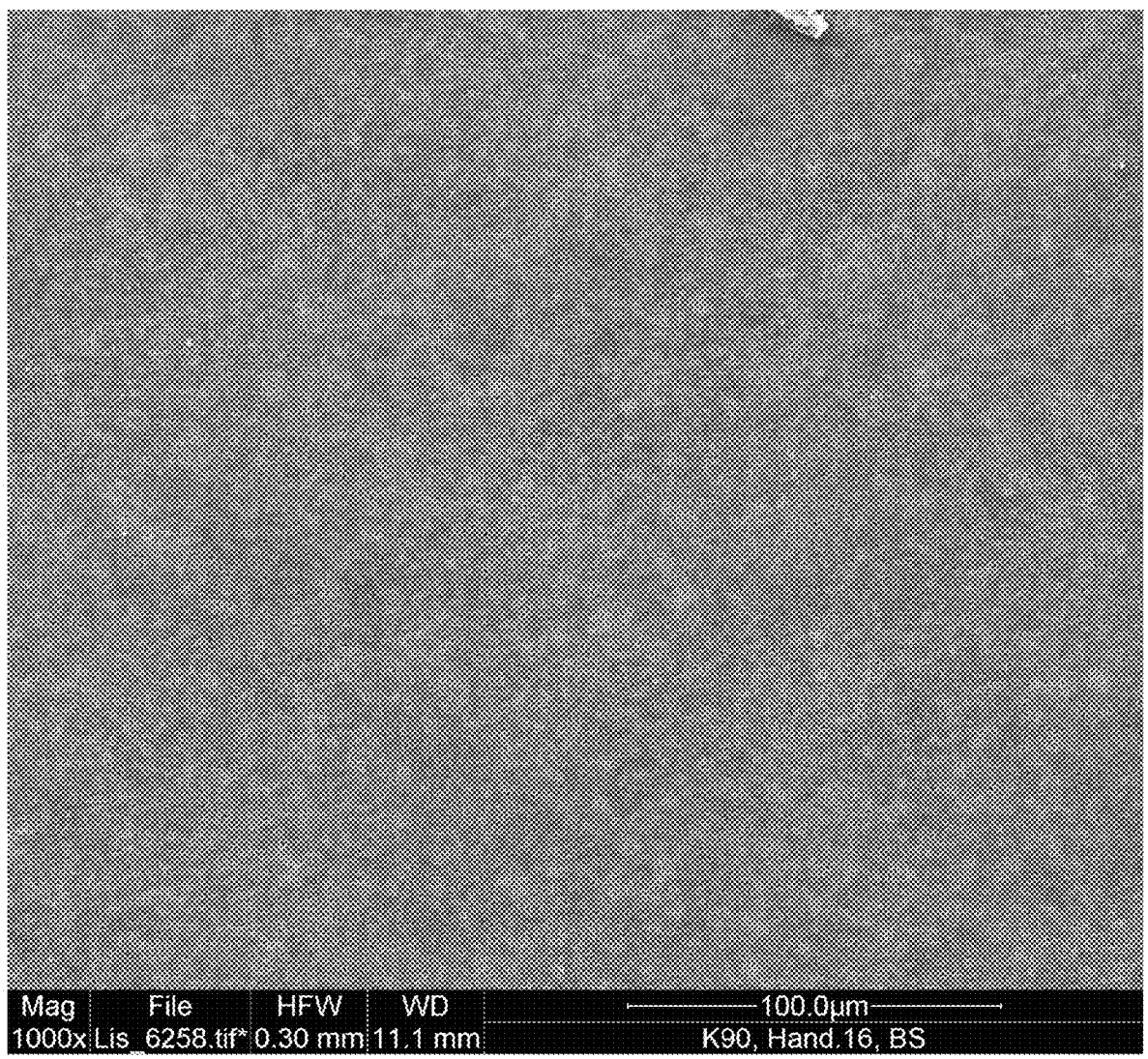
FIG. 2 shows an SEM micrograph of the support-side (glass plate-side) major surface of the membrane from Inventive Example 1, and shows a typical pore structure. The structure (in contrast to the upper coating-side major surface) is largely unaffected by the upper coating and shows a very similar structure to the support-side major surface of the membrane from Comparative Example 1.

SEM micrographs of the major surfaces of the membrane from Inventive Example 1 are shown in FIGS. 1 and 2. Clearly apparent from FIG. 1 is an open-pore structure with high porosity.

The permeability was 0.89±0.1 mL/(min·cm²·bar)

Comparative Example 1

For Comparative Example 1, the casting solution used was identical to the casting solution from Inventive Example 1. The protective solution was omitted.

Membrane Production

The casting solution with the composition from Table 1 was coated out evenly to a thickness of 300 μm, using a knife coater, onto a glass plate used as support, in a dry (anhydrous) nitrogen atmosphere at a glass plate and atmosphere temperature of 22° C. No protective solution was applied. The application process was over after less than 30 seconds.

Set up in an air atmosphere with 22° C. and <40% relative humidity was a water bath at 22° C. which was able to fully cover the glass plate. The coated layer on the glass plate was immersed fully into the water bath in less than 20 seconds, starting from one side of the glass plate, and shaken for 30 minutes. After these 30 minutes, the water was replaced and the glass plate, with the now precipitated membrane, was shaken again for 30 minutes. After that, the membrane was lifted from the glass plate and dried on a fleece underlay at 22° C. The dry membrane was subjected to the following characterizations: scanning electron microscopy (SEM) and throughflow.

Figure 3:
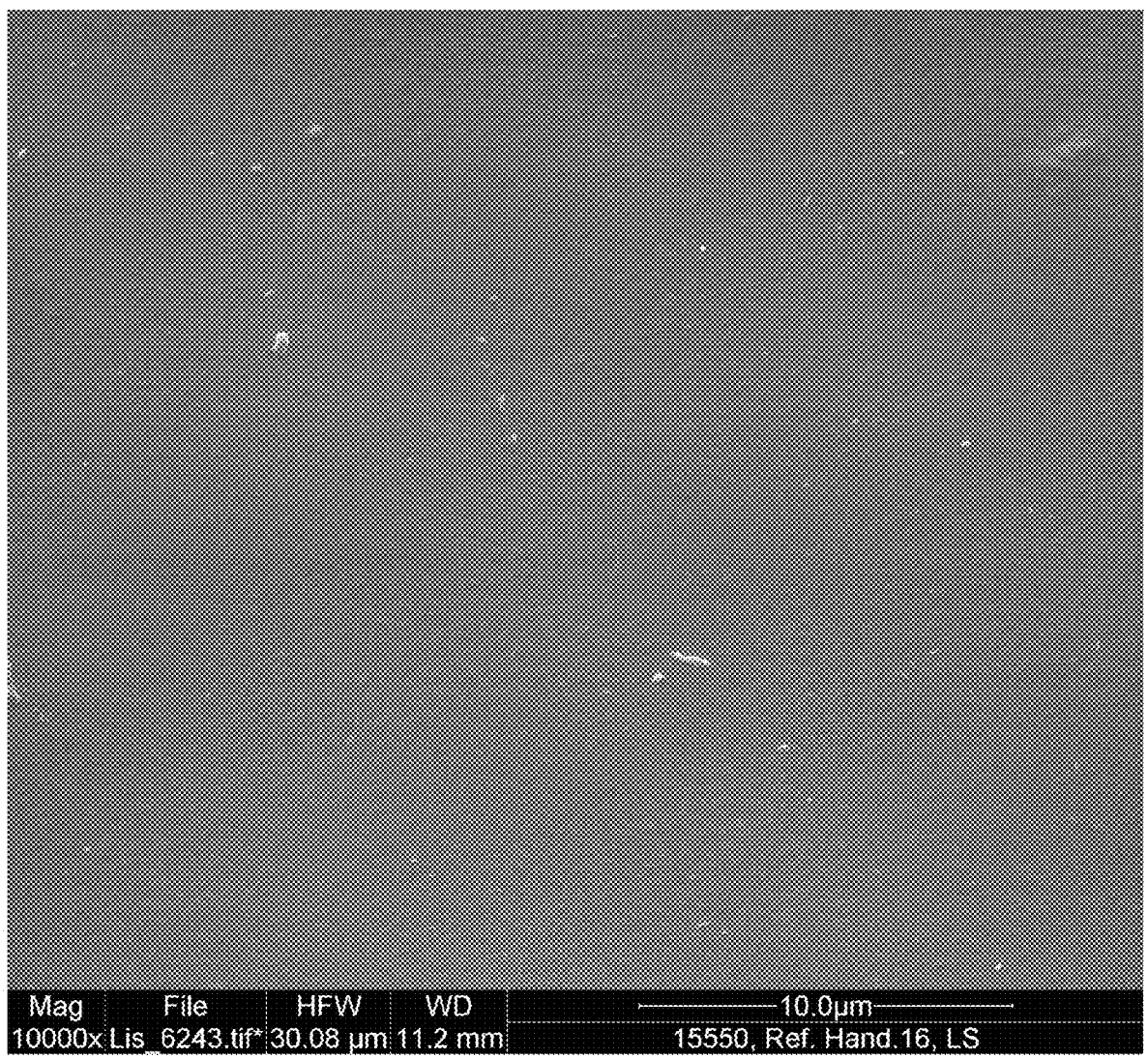
FIG. 3 shows an SEM micrograph of the air-side (the air side is the side opposite the support side) major surface of the membrane from Comparative Example 1. At ten thousand times magnification there are no pores in evidence.
Figure 4:
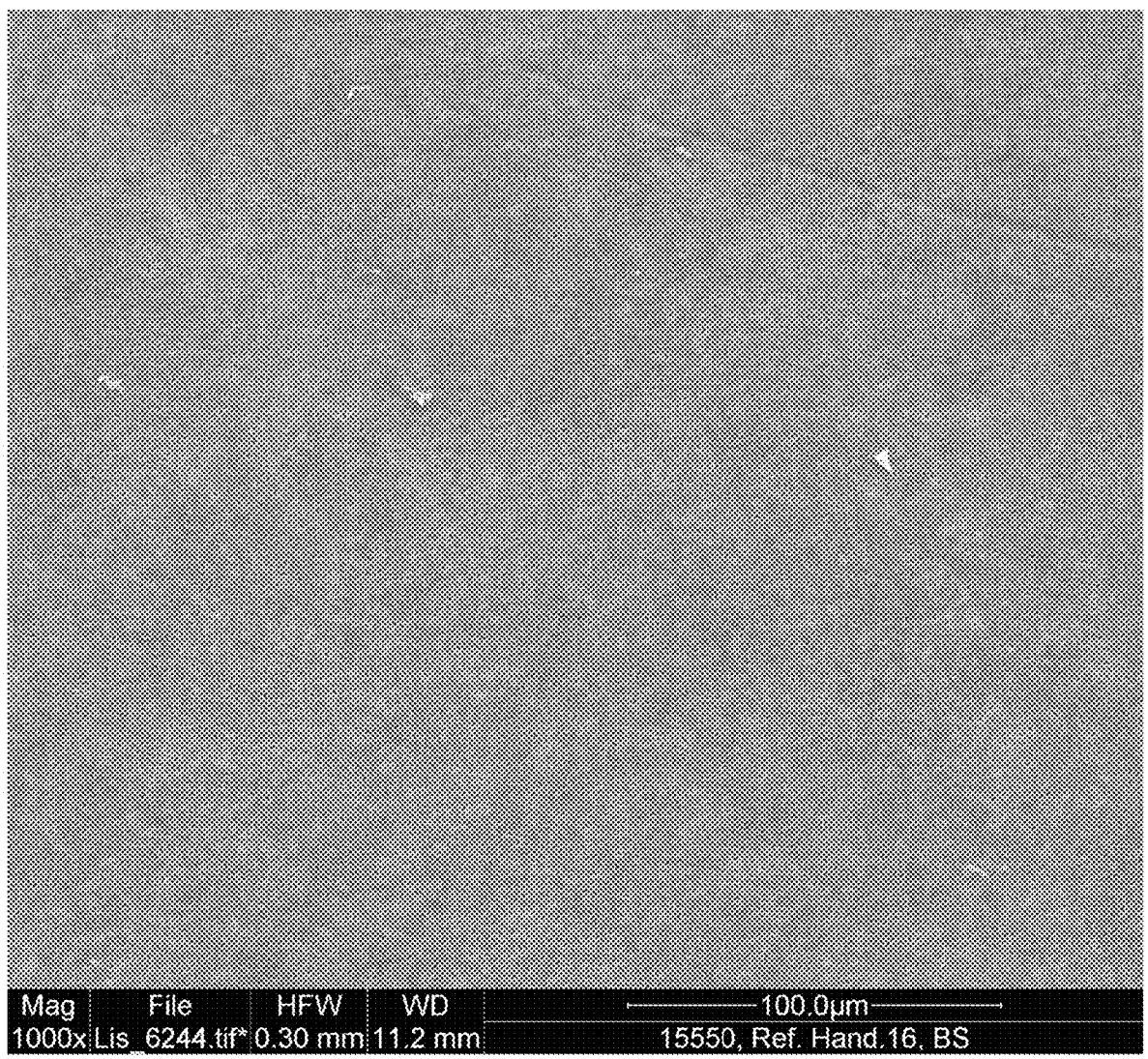
FIG. 4 shows an SEM micrograph of the support-side major surface of the membrane of Comparative Example 1. There are no significant differences in evidence relative to the belt-side surface structure of the membrane from Inventive Example 1.

SEM micrographs of the major surfaces of the membrane from Comparative Example 1 are shown in FIGS. 3 and 4. Clearly apparent from FIG. 3 is a dense structure with low porosity (skin layer).

The permeability was less than 0.1 mL/(min·cm²·bar)

Comparative Example 2: Example 3 from EP 2 134 455 B1

Comparative Example 2 is based on Example 3 of EP 2 134 455 B1. In this case, for the upper coating, a protective solution was used which comprises a precipitant in a concentration which on contact with the casting solution leads to the precipitation of the membrane-forming polymer. Comparative Example 2 was otherwise carried out like Inventive Example 1.

TABLE 3

Composition of the casting solution

| Constituents | Mass fraction [%] |
|---|---|
| Polyethersulfone (PESU) of "Ultrason E6020" type from BASF | 13 |
| PEG 400 | 70 |
| N-Methylpyrrolidone (NMP) | 30 |

TABLE 4

Composition of the upper coating solution

| Constituents | Mass fraction [%] |
|---|---|
| Polyethylene glycol 400 (PEG 400) | 80 |
| Water | 20 |

Figure 5:
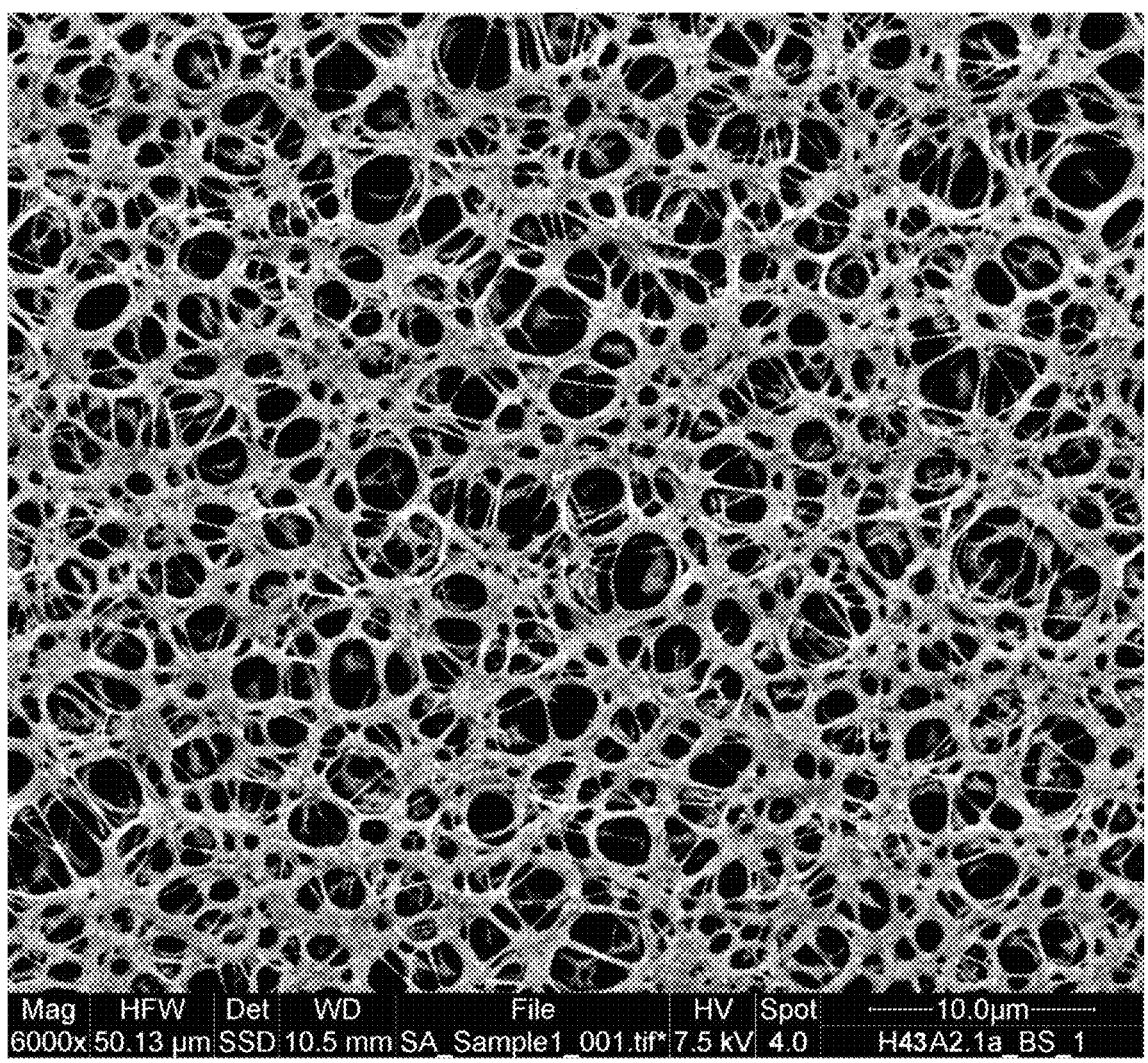
FIG. 5 shows an SEM micrograph of the support side major surface of the membrane from Comparative Example 2. A pronounced pore structure is in evidence.
Figure 6:
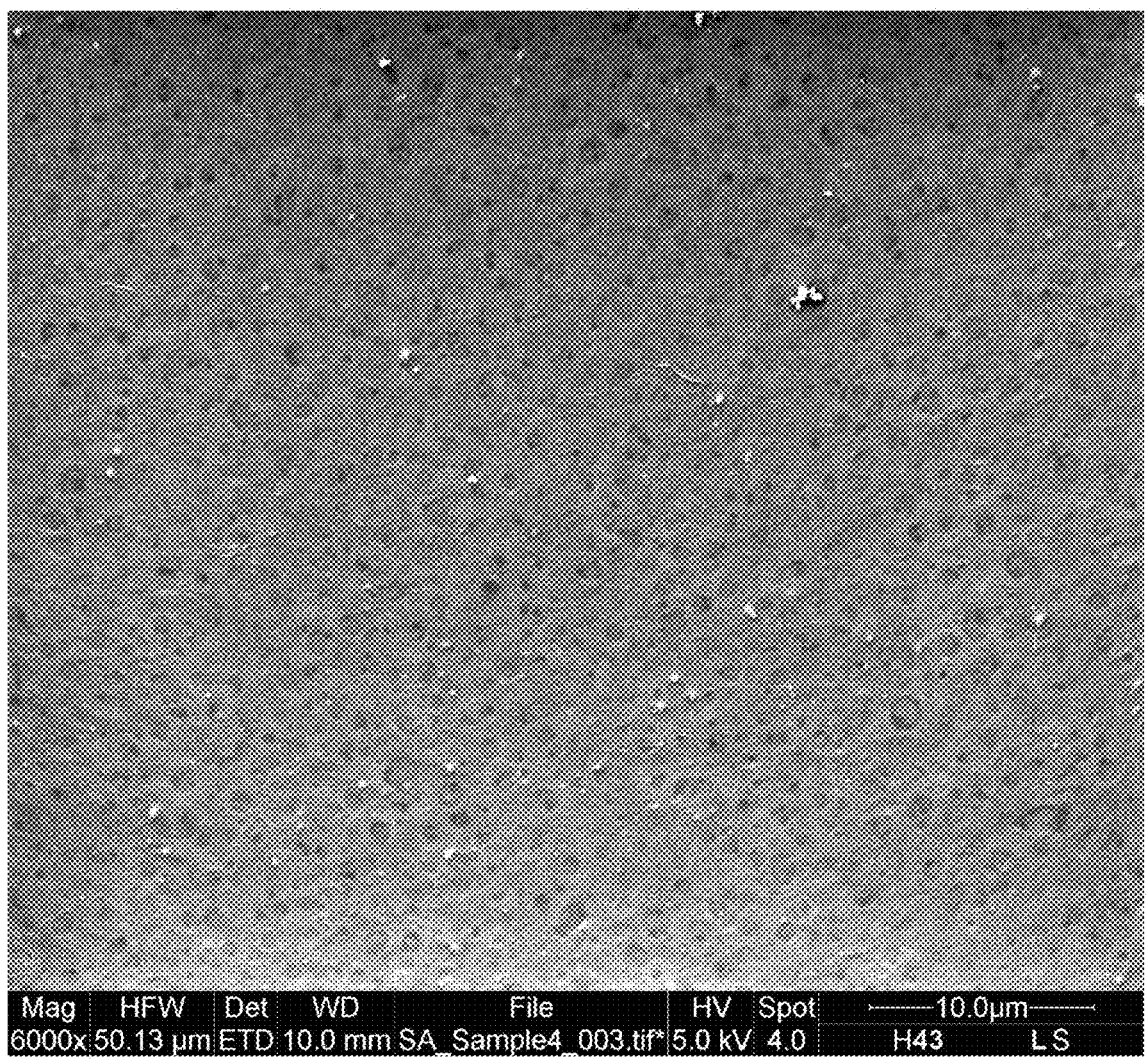
FIG. 6 shows an SEM micrograph of the upper coating-side major surface of the membrane from Comparative Example 2. Clearly in evidence is a skin layer without perceptible pores on the surface.

SEM micrographs of the major surfaces of the membrane from Comparative Example 1 are shown in FIGS. 5 and 6. Clearly apparent from FIG. 6 is a dense structure with a low porosity (skin layer).

Inventive Example 2: Lower Coating and Upper Coating

The compositions of the casting solution and protective solutions used in this example are reported in tables 5, 6 and 7.

TABLE 5

Composition of the casting solution

| Constituents | Mass fraction [%] |
|---|---|
| Polyethersulfone of "Ultrason E6020" type from BASF | 12.00% |
| 2-Pyrrolidone | 77.00% |
| PVP-VA copolymer of "PVP S630" type from Ashland | 3.00% |
| Glycerol | 5.00% |
| Water | 3.00% |

TABLE 6

Composition of protective solution 1 (lower coating solution)

| Constituents | Mass fraction [%] |
|---|---|
| 2-Pyrrolidone | 70% |
| Polyethylene glycol ($M_w$ = 30 000 g/mol) | 30% |

TABLE 7

Composition of protective solution 2 (upper coating solution)

| Constituents | Mass fraction [%] |
|---|---|
| 2-Pyrrolidone | 100 |

Membrane Production

Protective solution 1 (surrogate solution 1) was heated to 60° C. and coated out uniformly to a thickness of 100 μm using a knife coater on a glass plate under an air atmosphere at 22° C. and <40% relative humidity. The protective solution applied and also the glass plate were subsequently cooled to room temperature.

The casting solution was subsequently applied uniformly to the surrogate solution 1 with a thickness of 200 μm using a knife coater. Then protective solution 2 (surrogate solution 2) was coated over it in a thickness of 100 μm by means of a knife coater.

A water bath with 22° C. was set up which was able to fully cover the glass plate. The glass plate with the film consisting of coated-out casting solution and surrogate solutions was immersed completely into the water bath in less than 20 seconds, starting from one side of the glass plate, and shaken for 30 minutes. After these 30 minutes, the water was replaced and the glass plate with the now precipitated membrane was shaken again for 30 minutes, during which the protective solution layers dissolved and only the membrane remained on the glass plate. After that, the membrane was lifted from the glass plate and dried on a fleece underlay at 22° C. The dry membrane was subjected to the characterizations.

The result is shown in FIGS. 7 and 11. The SEM micrographs represented in FIGS. 7 and 11 were obtained under the following conditions: recording instrument: FEI Quants 200 F; accelerating voltage: 19 kV; magnification: 4000 times.

Comparative Example 3

The composition of the casting solution used in this example is reported in table 8.

TABLE 8

Casting solution

| Constituents | Mass fraction [%] |
|---|---|
| Polyethersulfone of "Ultrason E6020" type from BASF | 12.00 |
| 2-Pyrrolidone | 77.00 |
| PVP-VA copolymer of "PVP S630" type from Ashland | 3.00 |
| Glycerol | 5.00 |
| Water | 3.00 |

Membrane Production

The casting solution was applied uniformly with a thickness of 250 μm, using a knife coater, to a glass plate, and was exposed to the air atmosphere for 3 minutes. A water bath with 22° C. was set up, which was able to fully cover the glass plate. The coated-out casting solution on the glass plate was immersed fully into the water bath in less than 20 seconds, starting from one side of the glass plate, and shaken for 30 minutes. After these 30 minutes the water was replaced and the glass plate, with the now precipitated membrane, was shaken again for 30 minutes. After that the membrane was lifted from the glass plate and dried on a fleece underlay at 22° C. The dry membrane was subjected to the characterizations.

The result in shown in FIG. 8 and FIG. 12 and in table 9.

TABLE 9

Comparison of Inventive Example 2 with Comparative Example 3

|  | Inventive Example 2 | Comparative Example 3 |
|---|---|---|
| Surface porosity (air side) | 40% | 0% |
| Surface porosity (belt or support side) | 63% | 22% |

Inventive Example 3

The compositions of the casting solution and protective solution used in this example are reported in tables 10 and 11.

TABLE 10

Composition of the casting solution

| Constituents | Mass fraction [%] |
|---|---|
| Polyethersulfone of "Ultrason E6020" type from BASF | 12.00 |
| 2-Pyrrolidone | 77.00 |
| PVP-VA copolymer of "PVP S630" type from Ashland | 3.00 |
| Glycerol | 5.00 |
| Water | 3.00 |

TABLE 11

Composition of the protective solution

| Constituents | Mass fraction [%] |
|---|---|
| 2-Pyrrolidone | 100 |

Membrane Production

A casting solution was applied evenly with a thickness of 250 μm, using a knife coater, to a glass plate, and directly thereafter was coated with the protective solution as upper coating in a thickness of 50 μm by means of a knife coater. A water bath with 22° C. was set up, which was able to fully cover the glass plate. The glass plate with the coated-out casting solution and protective solution was immersed completely into the water bath in less than 20 seconds, starting from one side of the glass plate, and shaken for 30 minutes. After these 30 minutes the water was replaced and the glass plate, with the now precipitated membrane, was again shaken for 30 minutes. After complete removal of the upper coating/protective solution layer, the membrane was lifted from the glass plate and dried on a fleece underlay at 22° C. The dry membrane was subjected to the characterizations.

The results are shown in FIG. 9 and also in tables 13 and 14.

Comparative Example 4

The composition of the casting solution used in this example is reported in table 12.

TABLE 12

Composition of the casting solution

| Constituents | Mass fraction [%] |
|---|---|
| Polyethersulfone of "Ultrason | 12.00 |

TABLE 12-continued

Composition of the casting solution

| Constituents | Mass fraction [%] |
|---|---|
| E6020" type from BASF | |
| 2-Pyrrolidone | 77.00 |
| PVP-VA copolymer of "PVP S630" type from Ashland | 3.00 |
| Glycerol | 5.00 |
| Water | 3.00 |

Membrane Production

A casting solution was applied evenly with a thickness of 250 μm, using a knife coater, to a glass plate. A water bath with 22° C. was set up, which was able to fully cover the glass plate. The coated-out casting solution on the glass plate was immersed completely into the water bath in less than 20 seconds, starting from one side of the glass plate, and shaken for 30 minutes. After these 30 minutes the water was replaced and the glass plate, with the now precipitated membrane, was again shaken for 30 minutes. After that, the membrane was lifted from the glass plate and dried on a fleece underlay at 22° C. The dry membrane was subjected to the characterizations.

The results are shown in FIG. 10 and also in tables 13 and 14.

TABLE 13

|  | Inventive Example 3 | Comparative Example 4 |
|---|---|---|
| Surface porosity (air side) | 42% | 0% |
| Surface porosity (belt side) | 21% | 20% |

TABLE 14

|  | Inventive Example 3 | Comparative Example 4 |
|---|---|---|
| Permeability [mL/(min · cm² · bar)] | 9 ± 3 | <1 |

As can be seen from table 13, Inventive Example 3, owing primarily to the higher surface porosity of the air side, has a substantially higher permeability and therefore a higher throughflow than Comparative Example 4.

To determine the permeability of the membranes produced, they were wetted in NaCl solution (0.9 wt %) and then transferred into a permeability measurement cell. This cell consisted of eight identical metal cylinders (pressure-resistant steel container, 200 mL capacity, Sartorius Stedim Biotech GmbH). The measurement cells could be filled with a defined volume of salt solution. Then a pressure of 0.1 to 1 bar (according to permeability) was applied and the bottom valve was opened. The permeate was collected and weighed in a time-resolved manner. The specific permeability is calculated as follows:

$$\chi_{spec} = \frac{V_p}{t \cdot A_a \cdot p}$$

Here, $V_p$ is the permeate volume, t the time required to collect this permeate volume $V_p$, $A_a$ the membrane inflow area, and p the applied pressure.

Through the method of the invention it is possible to provide monolayer porous polymer membranes with high surface and total porosity, hence allowing thin membranes with high filtration performance to be obtained. Through the method of the invention an innovative control option is gained for influencing the phase inversion during formation of membranes from a casting solution, and consequently the method is less sensitive to fluctuations in parameters such as pressure, temperature, and precipitant concentration during the phase inversion.

The invention claimed is:

1. A method for producing a porous monolayer polymer membrane, which comprises the following steps:
   (A) providing a membrane-forming casting solution which comprises a membrane-forming polymer and a solvent therefor;
   (B) providing a non-membrane-forming and nonprecipitating protective solution;
   (C) providing a support;
   (D) applying at least the casting solution and the protective solution to the support to form a film comprising a casting solution layer and a protective solution layer bordering thereon, wherein the film is formed by applying the casting solution to the support to form the casting solution layer, and applying the protective solution layer to the casting solution layer to form the protective solution layer;
   (E) contacting the film with a precipitant; and
   (F) removing the protective solution layer by dissolving or chemically decomposing the protective layer solution.

2. The method as claimed in claim 1,
   wherein the protective solution comprises a polymer not capable of forming a membrane (surrogate polymer) and a solvent therefor.

3. The method of claim 1,
   wherein the protective solution contains no precipitant for the membrane-forming polymer.

4. The method of claim 2,
   wherein the protective solution contains no precipitant for the membrane-forming polymer.

5. The method of claim 1, wherein the porous monolayer polymer membrane is asymmetric.

6. The method of claim 5, wherein the porous monolayer polymer membrane has an asymmetry factor of 1.5 to 10.

7. The method of claim 1, wherein the membrane-forming polymer is selected from cellulose acetate, cellulose nitrate, polysulfone, polyvinylidene difluoride, polyethersulfone, polyetheretherketone, polyacrylonitrile, or polymethyl methacrylate.

* * * * *